(12) United States Patent
Sundaresan et al.

(10) Patent No.: US 10,852,416 B2
(45) Date of Patent: *Dec. 1, 2020

(54) IN-STORE INTERACTION AND LOCATION SYSTEM FOR INTERFACING USERS WITH PRODUCTS

(71) Applicant: NEC Laboratories America, Inc., Princeton, NJ (US)

(72) Inventors: Karthikeyan Sundaresan, Manalapan, NJ (US); Eugene Chai, Monmouth Junction, NJ (US); Sampath Rangarajan, Bridgewater, NJ (US)

(73) Assignee: NEC CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 16/582,416

(22) Filed: Sep. 25, 2019

(65) Prior Publication Data

US 2020/0018847 A1 Jan. 16, 2020

Related U.S. Application Data

(63) Continuation of application No. 16/381,294, filed on Apr. 11, 2019.

(Continued)

(51) Int. Cl.
*G08B 21/00* (2006.01)
*G01S 13/76* (2006.01)
(Continued)

(52) U.S. Cl.
CPC .......... *G01S 13/765* (2013.01); *G01S 13/751* (2013.01); *G06K 19/0725* (2013.01);
(Continued)

(58) Field of Classification Search
CPC ...... G01S 13/751; G01S 13/765; G01S 7/023; G06K 19/0724; G06K 19/0725; G08B 13/2431; H01Q 1/2216; H01Q 1/2225
See application file for complete search history.

(56) References Cited

U.S. PATENT DOCUMENTS

2004/0005863 A1* 1/2004 Carrender ............ G06K 7/0008
455/41.1
2006/0151613 A1* 7/2006 Zmood .................. G06K 7/086
235/492

(Continued)

OTHER PUBLICATIONS

Iyer et al., "Inter-Technology Backscatter: Towards Internet Connectivity for Implanted Devices", SIGCOMM, Aug. 2016, 14 pages.

(Continued)

*Primary Examiner* — Mark S Rushing
(74) *Attorney, Agent, or Firm* — Joseph Kolodka

(57) ABSTRACT

An in-store interaction and location system is provided. At least one RF backscatter transmitter, hosted on a device, is configured to emit a RF signal on a frequency. A set of passive RF backscatter tags, each associated with a respective one of a plurality of products in a given store area, is configured to reflect and frequency shift the RF signal to a different frequency. At least one RF backscatter receiver, hosted on another device, is configured to read the plurality of products on the different frequency by detecting a distributed ambient backscatter signal generated by a reflection and frequency shifting of the RF signal by the passive RF backscatter tag. At least one of the device and the other device is configured to maintain an inventory and a location of the plurality of products in the given store area and provide the inventory and location to a user device.

19 Claims, 14 Drawing Sheets

Related U.S. Application Data

(60) Provisional application No. 62/657,704, filed on Apr. 13, 2018, provisional application No. 62/696,928, filed on Jul. 12, 2018.

(51) Int. Cl.
 H01Q 1/22 (2006.01)
 G06K 19/07 (2006.01)
 G01S 13/75 (2006.01)
 G08B 13/24 (2006.01)

(52) U.S. Cl.
 CPC ......... H01Q 1/2216 (2013.01); H01Q 1/2225 (2013.01); G08B 13/2431 (2013.01)

(56) References Cited

U.S. PATENT DOCUMENTS

| | | | | |
|---|---|---|---|---|
| 2006/0289635 | A1* | 12/2006 | Lin | G06Q 30/06 235/383 |
| 2009/0002172 | A1* | 1/2009 | Hannah | H02K 7/1846 340/572.1 |
| 2009/0303005 | A1* | 12/2009 | Tuttle | G06K 7/10316 340/10.1 |
| 2010/0120368 | A1* | 5/2010 | Smith | G06K 7/0008 455/63.1 |
| 2016/0078264 | A1* | 3/2016 | Armstrong | G08B 13/2417 340/572.1 |
| 2016/0301257 | A1* | 10/2016 | Parks | H02J 50/20 |
| 2017/0262669 | A1 | 9/2017 | Tuttle | |
| 2017/0364715 | A1 | 12/2017 | Sadr | |
| 2018/0196974 | A1* | 7/2018 | Hunziker | G06K 19/07749 |

OTHER PUBLICATIONS

Zhang et al., "Enabling Practical Backscatter Communication for On-body Sensors", SIGCOMM, Aug. 2016, 14 pages.

* cited by examiner

IN-STORE INTERACTION AND LOCATION SYSTEM FOR INTERFACING USERS WITH PRODUCTS

RELATED APPLICATION INFORMATION

This application claims priority to U.S. Provisional Application No. 62/657,704, filed on Apr. 13, 2018, incorporated herein by reference in its entirety. This application claims priority to U.S. Provisional Application No. 62/696,928, filed on Jul. 12, 2018, incorporated herein by reference in its entirety. This application is related to U.S. patent application Ser. No. 16/381,294, entitled "Tagging Objects In Indoor Spaces Using Ambient Distribution Backscatter", filed on Apr. 11, 2019, and which is incorporated by reference herein in its entirety. This application is related to an application entitled "In-Home Inventory And Location System", having Ser. No. 16/582,314, and which is incorporated by reference herein in its entirety. This application is related to an application entitled "Backscatter-Aided Navigation System", having Ser. No. 16/582,364, and which is incorporated by reference herein in its entirety.

BACKGROUND

Technical Field

The present invention relates to object detection and more particularly to an in-store inventory system.

Description of the Related Art

Today, retailers are unable to gather insights into the shopping and consumption behavior of everyday products by their consumers. This arises from the inability to tag and monitor everyday products in consumer spaces in a cost-effective and scalable manner. Hence, there is a need for a way to tag everyday products in consumer spaces in a cost-effective and scalable manner.

SUMMARY

According to an aspect of the present invention, an in-store interaction and location system is provided. The system includes at least one RF backscatter transmitter, hosted on a device, configured to emit a Radio Frequency (RF) signal on a frequency. The system further includes a set of passive RF backscatter tags, each associated with a respective one of a plurality of products in a given store area and configured to reflect and frequency shift the RF signal to a different frequency. The system also includes at least one RF backscatter receiver, hosted on another device, configured to read the plurality of products on the different frequency by detecting a distributed ambient backscatter signal generated by a reflection and frequency shifting of the RF signal by the passive RF backscatter tag. At least one device selected from the group consisting of the device hosting the at least one RF backscatter transmitter and the other device hosting the at least one RF backscatter receiver is configured to maintain an inventory and a location of the plurality of products in the given store area and provide the inventory and location to a user device.

According to another aspect of the present invention, a method is provided for maintaining an in-store interaction and location information. The method includes emitting, by at least one RF backscatter transmitter hosted on a device, a Radio Frequency (RF) signal on a frequency. The method further includes reflecting and frequency shifting, by a passive RF backscatter tag associated with a product, the RF signal to a different frequency. The method also includes reading, by at least one RF backscatter receiver, the product on the different frequency by detecting a distributed ambient backscatter signal generated by a reflection and frequency shifting of the RF signal by the passive RF backscatter tag. The method additionally includes maintaining, by at least one device selected from the group consisting of the device hosting the at least one RF backscatter transmitter and the other device hosting the at least one RF backscatter receiver, an inventory and a location of the plurality of products in the given store area. The method further includes providing, by the at least one device, the inventory and location to a user device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to an in-store inventory system.

In an embodiment, an ambient, distributed, orthogonal back scattering solution is provided. One or more embodiments of the present invention involve low-cost, passive, orthogonal backscattering tags to tag everyday products, while repurposing the existing wireless interfaces in smart devices (e.g., smartphones, voice-activated speakers, and so forth) to monitor the products (read the tags). By leveraging ambient backscattering, embodiments of the present invention do not require an RFID infrastructure, and by enabling orthogonal bands (one band for transmitting and another band for receiving) through its carefully designed passive tags, can accomplish backscattering using two separate (existing) devices without the need for self-interference cancellation. The present invention can be used to show significant insights into consumer shopping behavior for retailers as well as provide other benefits as readily appreciated by one of ordinary skill in the art given the teachings of the present invention provided herein.

Figure 1:
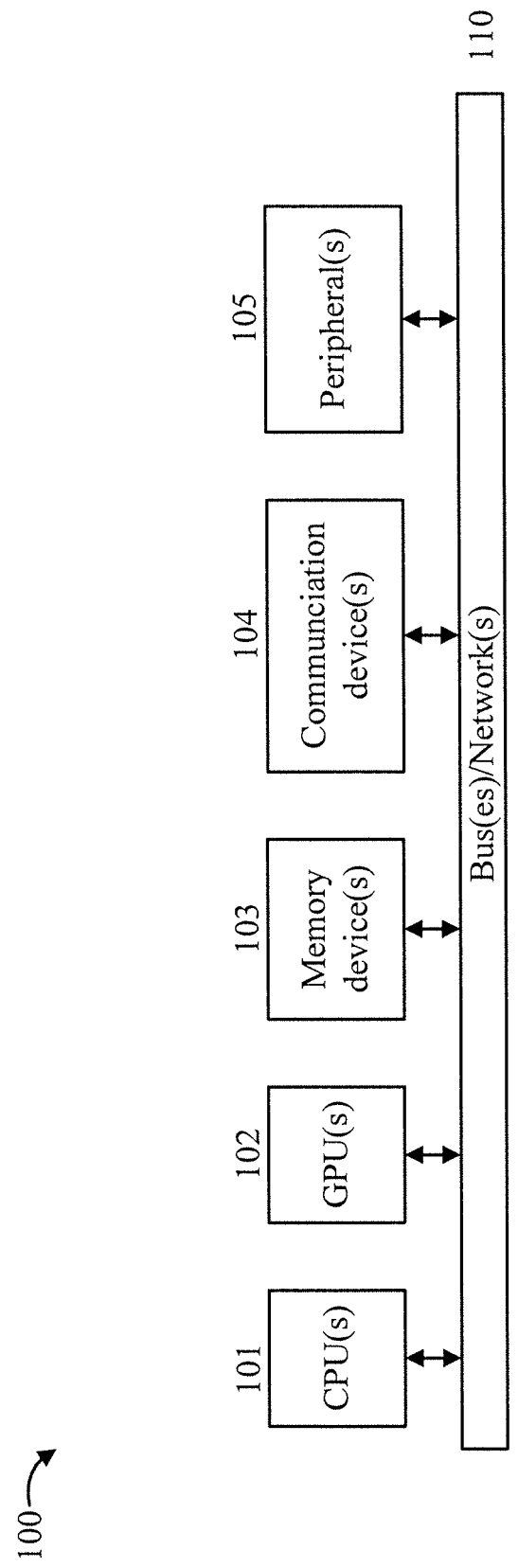
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100. Moreover, system 100 can be used to analyze results of the tagging and to perform actions responsive to tagging results. These and other uses of system 100 are readily determined by one of ordinary skill in the art given the teachings of the present invention provided herein, while maintaining the spirit of the present invention.

Figure 2:
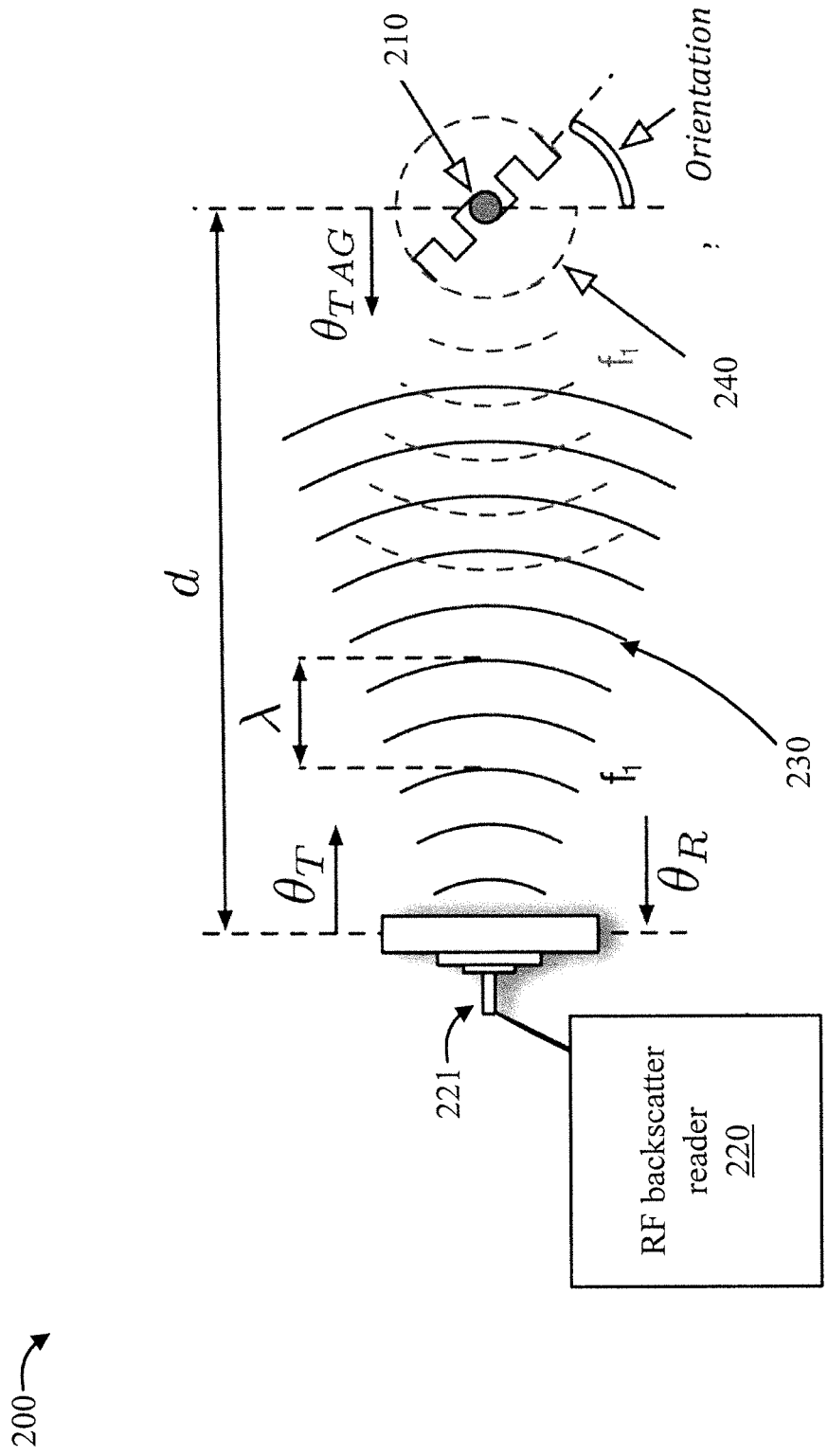
FIG. 2 is a block diagram showing an exemplary RF backscattering mechanism to which the present invention can be applied, in accordance with an embodiment of the present invention.

One or more embodiments of the present invention leverage passive radio frequency (RF) tags to tag and monitor everyday objects. Passive RF tags do not require a battery and cost a few cents each. The RF tags can be pasted onto objects and work by simply backscattering (reflecting) the signal energy sent by the transmitter, thereby eliminating the need to generate their own signal, as shown in FIG. 2. By modulating the state of the reflected signal, the tag is able to convey information stored in it, which could be related to the object that it tags. While the amount of information that can be delivered by a RF tag is limited (few tens to hundreds of Kbps for UHF tags), its low cost, small form factor and passive nature, allows for scalable tagging of everyday objects in consumer spaces.

FIG. 2 is a block diagram showing an exemplary RF backscattering mechanism 200 to which the present invention can be applied, in accordance with an embodiment of the present invention.

The backscattering mechanism 200 involves a passive RF tag 210 and an RF reader 220 with an RF antenna 221.

In FIG. 2, d denotes a distance between the RF antenna 221 to the RF tag 210, $\lambda$, denotes a wavelength of the transmitted wave 230, $\theta_T$ denotes the phase of the transmit signal, $\theta_R$ denotes the phase of the backscattered received signal, and $f_1$ denotes a frequency of the transmitted wave 230 and also of the backscatter wave 240.

In operation, a Radio Frequency (RF) wave 230 is transmitted from the antenna 221 of the RF reader 220. Depending upon an orientation of the RF tag 210, the RF wave 230 reflects the RF wave 230 back to the RF antenna 221 as a backscatter wave 240. Moreover, by modulating the state of the reflected signal, i.e., the backscatter wave 240, the passive RF tag 210 is able to convey information stored in the passive RF tag 210.

The present invention enables low-cost, reliable tagging of everyday objects through the innovation of ambient, distributed, orthogonal-band backscattering on existing WIFI and Bluetooth capable devices. It has the following features. A first feature is (i) ambient: it leverages existing RF technologies such as WIFI and Bluetooth in smart devices, hubs and routers, that are already present in indoor spaces to enable backscattering. This avoids the need for an additional RFID-specific infrastructure (RFID readers and antennas). A second feature is (ii) distributed: instead of relying on a single, mono-static backscatter reader (i.e., joint Tx and Rx) with limited read reliability, it distributes the Tx and Rx functionality (henceforth referred to as B-Tx and B-Rx) of backscattering to two distributed devices in the environment (bi-static backscattering); this allows for the mobility of one or both of these devices to increase the diversity of channels and hence the reliability of tag reads. A third feature is (iii) orthogonal backscattering: bi-static readers deployed on two different devices (not just antennas), but same frequency band, face a serious issue known as self-interference; the latter significantly degrades the receiver's ability to decode the tag responses. The present invention eliminates this issue by instrumenting an orthogonal-band tag. The latter is capable of either backscattering simultaneously on an additional band that is orthogonal to that used by the B-Tx (dual-band tags), or backscattering directly on a different orthogonal channel (frequency-shifting tags). Both these approaches allow the B-Rx to bypass the need for canceling self-interference by receiving the tag's response on a band that is different (orthogonal) from that of the B-Tx.

A description will now be given regarding ambient, distributed backscatter, in accordance with one or more embodiments of the present invention.

Figure 3:
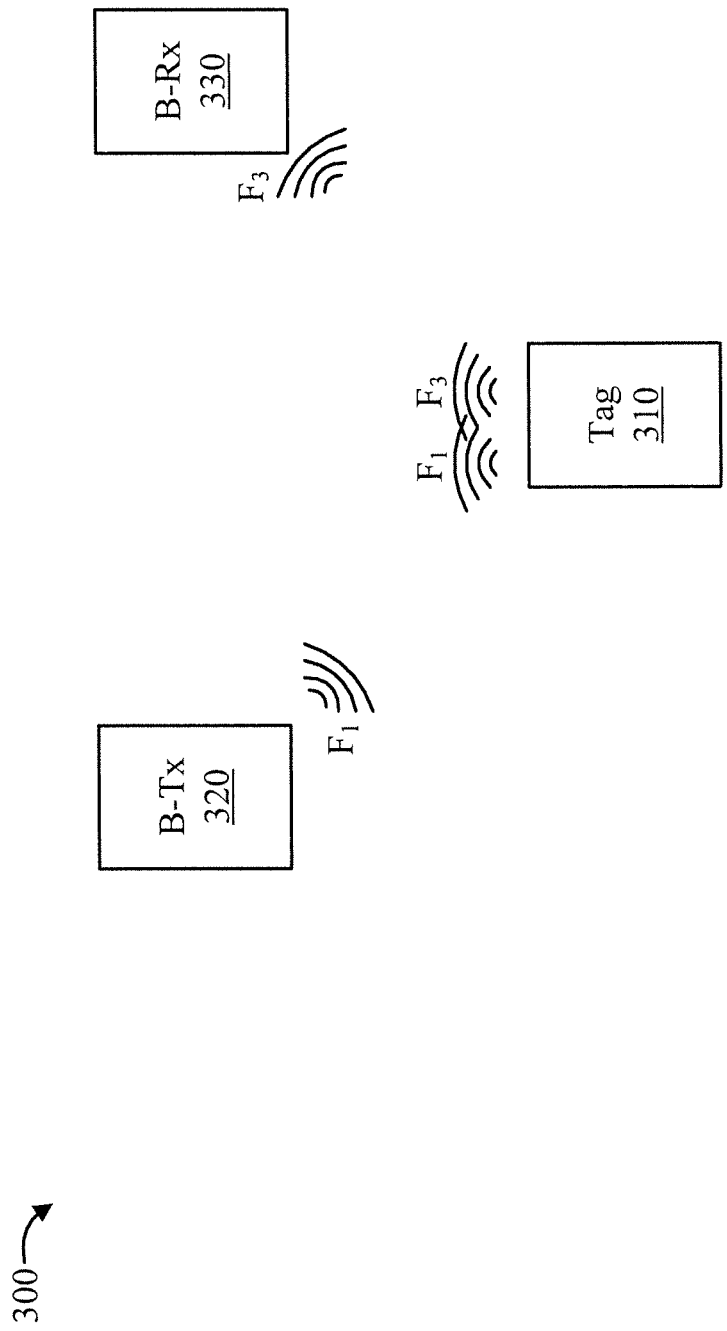
FIG. 3 is a block diagram showing an exemplary operation of the present invention involving harmonic tags, in accordance with an embodiment of the present invention.
Figure 4:
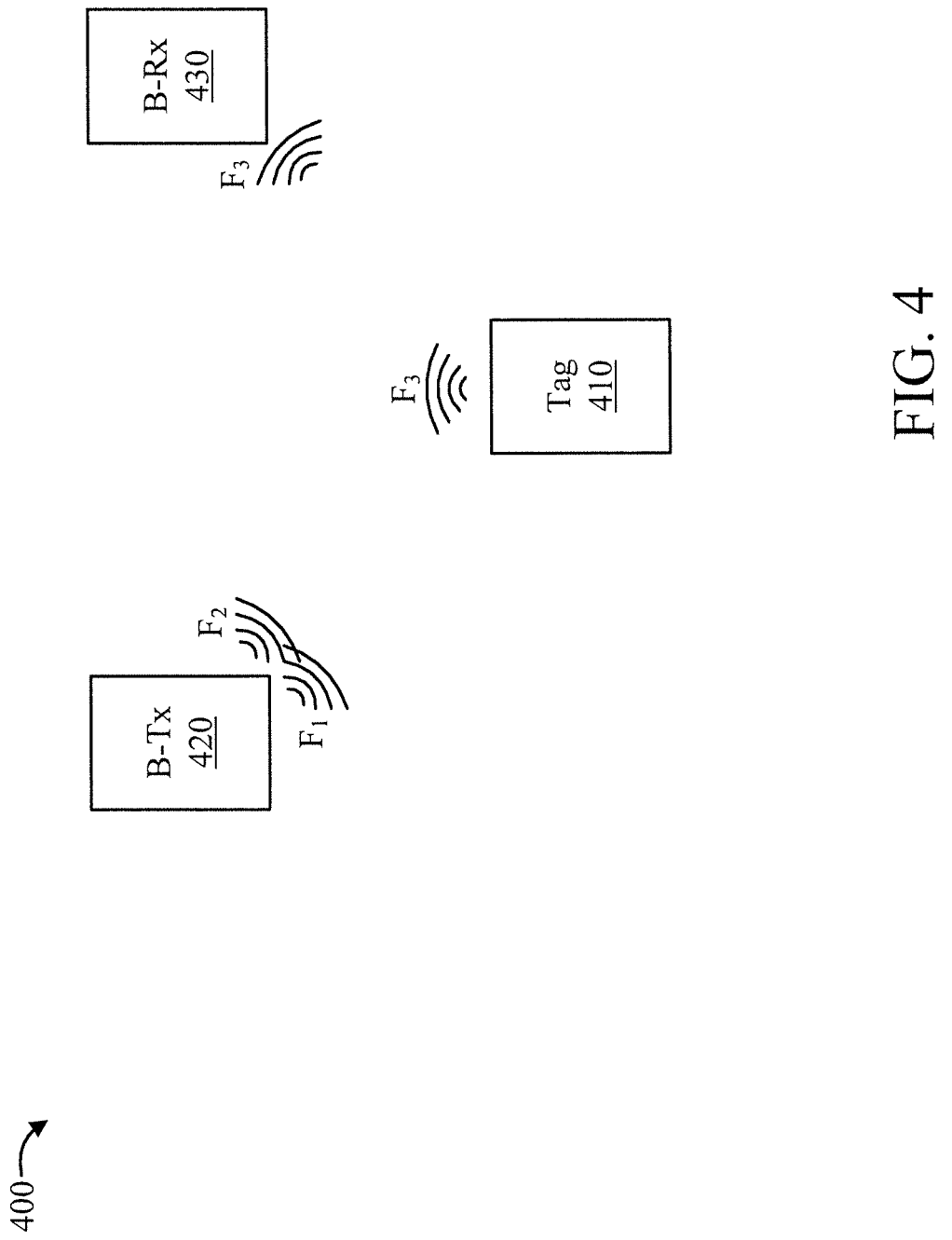
FIG. 4 is a block diagram showing an exemplary operation of the present invention involving frequency-shifting tags, in accordance with an embodiment of the present invention.
Figure 5:
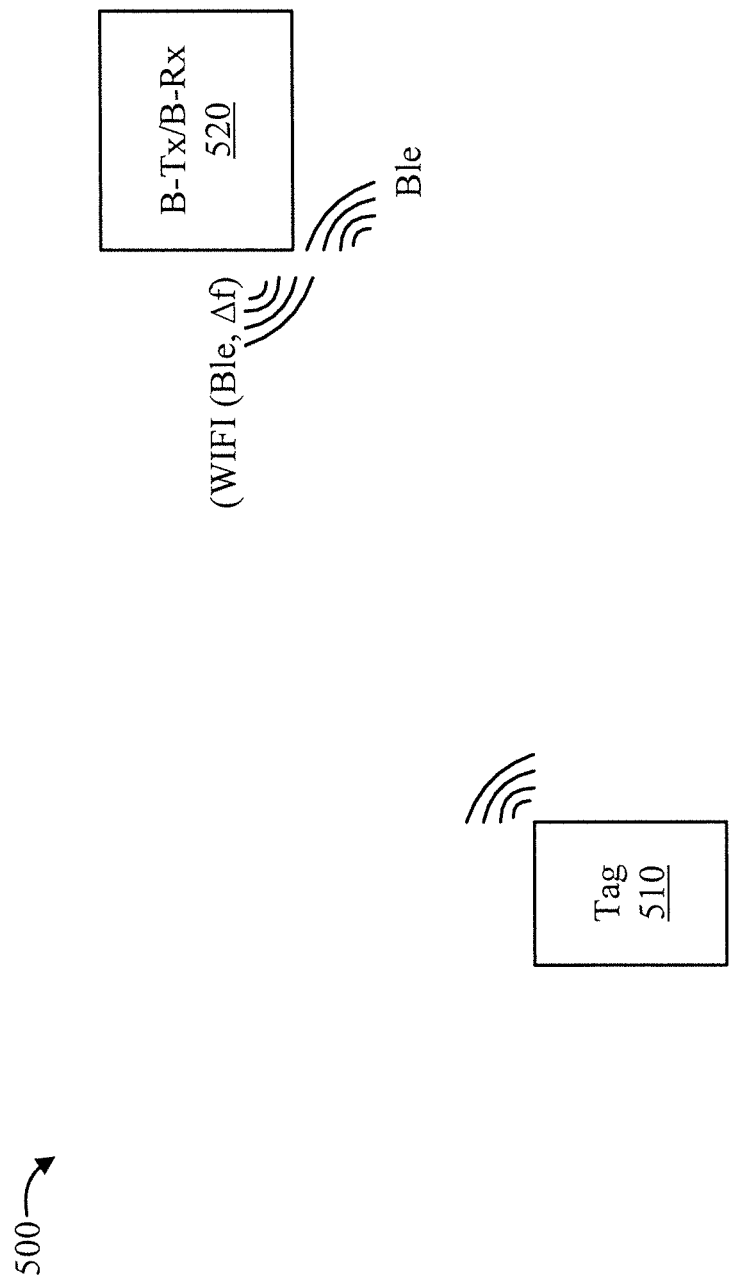
FIG. 5 is a block diagram showing an exemplary operation of the present invention involving a mono-static setup that uses a mobile device, in accordance with an embodiment of the present invention.
Figure 6:
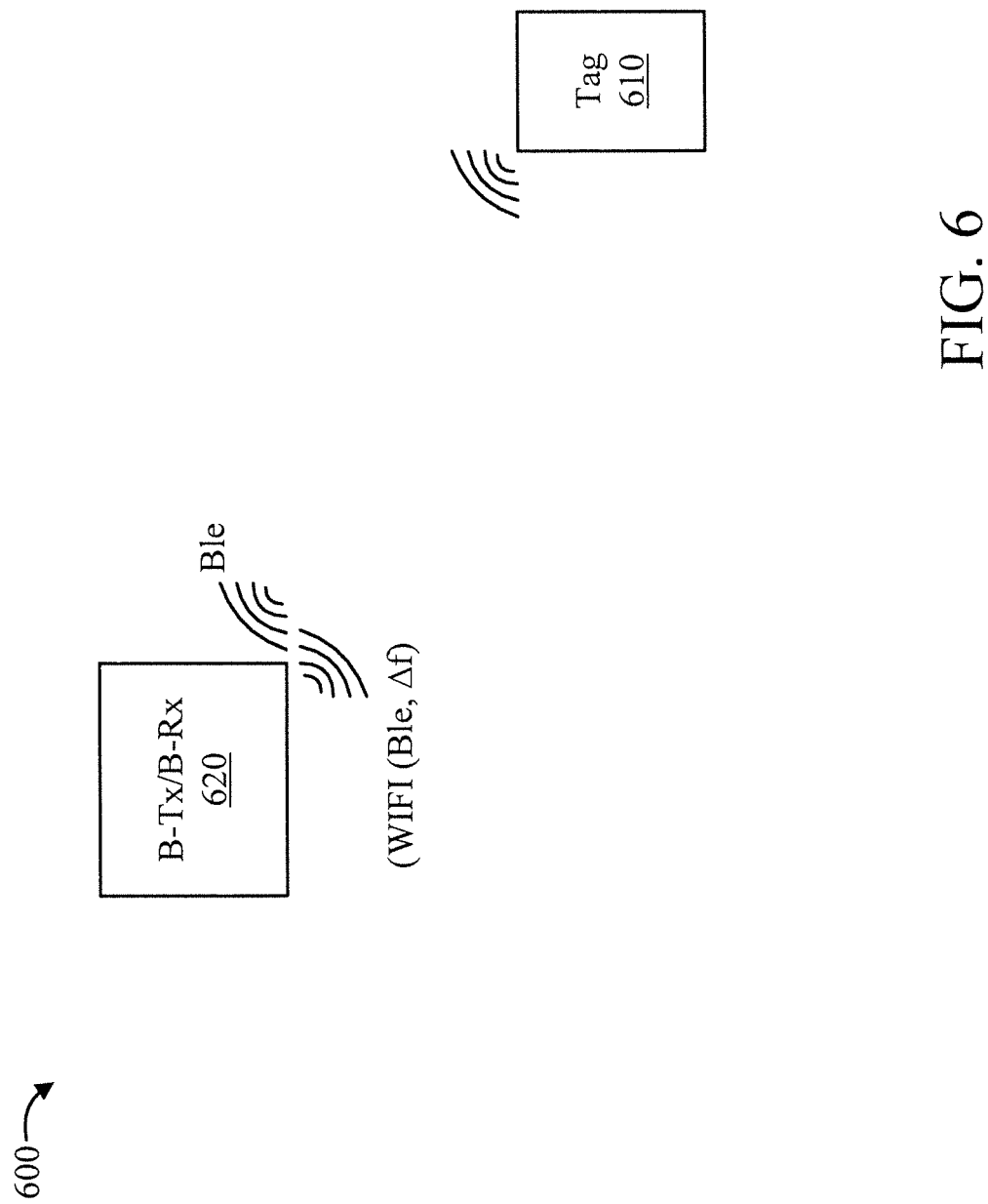
FIG. 6 is a block diagram showing an exemplary operation of the present invention involving a mono-static setup that uses a static device, in accordance with an embodiment of the present invention.

The present invention operates as shown in FIGS. 3-6. FIG. 3 is a block diagram showing an exemplary operation 300 of the present invention involving harmonic tags, in accordance with an embodiment of the present invention. In FIG. 3, a fixed frequency differential is used such that $\lambda f = k \cdot f_1$. The exemplary operation 300 is between a tag 310, a device 320 hosting B-Tx, and a device 330 hosting B-Rx. FIG. 4 is a block diagram showing an exemplary operation 400 of the present invention involving frequency-shifting tags, in accordance with an embodiment of the present invention. In FIG. 4, a flexible $\lambda f$ is used. The exemplary operation 400 is between a tag 410, a device 420 hosting B-Tx, and a device 430 hosting B-Rx. FIG. 5 is a block diagram showing an exemplary operation 500 of the present invention involving a mono-static setup that uses a mobile device, in accordance with an embodiment of the present invention. The exemplary operation 500 is between a tag 510 and a device 520 hosting B-Tx/B-Rx. FIG. 6 is a block diagram showing an exemplary operation 600 of the present invention involving a mono-static setup that uses a static device, in accordance with an embodiment of the present invention. The exemplary operation 600 is between a tag 610 and a device hosting B-Tx/B-Rx 620.

The devices hosting the B-Tx and B-Rx first communicate with each other (through an application) to coordinate a set of orthogonal channels (e.g. WIFI and/or Bluetooth channels) for transmission by B-Tx (CO and reception B-Rx ($C_r$), that will be employed in ambient, distributed backscattering. The B-Tx then illuminates the orthogonal-band tags on channel(s) $C_t$; the tags respond back on either channels $C_t$ and $C_r$ (dual-band tags) or just $C_r$ (frequency-shifting tags), which is then picked up by B-Rx on channel $C_r$. B-Rx then relays the tag's response back to B-Tx, which records, and maintains an inventory of tags read in the environment.

In a single phase backscattering protocol, the tag will perform a random back-off (to alleviate collisions with other tags) before backscattering its information. To be able to work with off-the-shelf WIFI and Bluetooth devices in the environment as B-Tx and B-Rx, the tags will encode information at the granularity of WIFI/Bluetooth packets, and the presence/absence of these packets will directly convey the tag's response to B-Rx in a single phase. If two phase protocols need to be employed between reader and tags, then B-Tx and B-Rx will coordinate closely to perform a lock-step execution of the two phases—the B-Tx will illuminate all the tags, the response from the tags is then received and relayed from B-Rx to B-Tx; B-Tx then polls a specific tag in phase 2, whose response at B-Rx is again relayed back to B-Tx.

Note that the B-Tx and B-Rx in our set-up could be a WIFI router and a smartphone, or a voice-activated device such as Amazon Echo® or Google Home® and a smartphone, or two smartphones, etc. The ability to leverage such existing devices adds diversity to the system without the need for additional readers. For example, when a user carrying a smartphone walks about the room, this increases the reliability of the tag reads by reading it from multiple different positions.

A description will now be given regarding dual-band tags for harmonic frequency shift, in accordance with one or more embodiments of the present invention.

The dual band tag is designed to backscatter simultaneously on two wireless (e.g. WIFI/Bluetooth) channels. The present invention can accomplish this with the help of harmonic tags that leverage the inherent non-linear characteristics of the chip in the tag to generate backscattering at fundamental and harmonic frequencies simultaneously (typically first and second harmonics are the relatively stronger ones in terms of signal strength). The harmonic frequencies can be used as the dual channel ($C_r = f_3$) for the B-Rx to receive the backscattered signal without having to suppress interference from B-Tx on the fundamental frequency ($C_t = f_1$). This is illustrated in FIG. 3. A tuning circuit can be added to the antenna to amplify the backscattered signal at the desired harmonic frequency.

A limitation of such harmonic tags is that f3 has to be an integer multiple of $f_1$, i.e., $\Delta f = f_3 - f_1 = k \cdot f_1$, $k \in Z^{1+}$.

Hence, there is not much flexibility in the choice of the orthogonal transmission and reception channels, which could affect the ability to leverage WIFI and Bluetooth channels on existing devices.

A description will now be given regarding frequency-shifting tags for arbitrary frequency shift, in accordance with an embodiment of the present invention.

To leverage existing smart devices and use their WIFI and Bluetooth channels flexibly, we need to enable arbitrary frequency shifts with our tags. To create such an arbitrary shift ($\Delta f$) of the reception channel from the transmission channel, while still keeping the tag completely passive, the present invention moves the associated complexity to the transmitter. In this case, B-Tx and B-Rx first coordinate the use of three channels for backscattering (instead of two in the case of dual-band tags), two for transmission $C_t = \{f_1, f_2\}$ and one for reception $C_r = f_3$, such that $f_2 - f_1 = f_3 - f_2 = \Delta f$. When B-Tx transmits on two channels $f_1$ and $f_2$ simultaneously, the frequency-shifting tag employs a passive mixer to generate frequencies of $f_2 + f_1$ and $f_2 - f_1$. The latter, $\lambda f$ is then used to (frequency shift) backscatter the signal from $f_2$ to $f_3 = f_2 + \lambda f$. B-Rx, which is tuned to f3 then receives the backscattered signal. This is illustrated in FIG. 4.

For example, if $\lambda f = 25$ MHz, then we can use two WIFI devices in 2.4 GHz, with two adjacent (orthogonal) channels being used at B-Tx (say channel 1 and 6) and the third adjacent one at B-Rx (say channel 11) to read these tags in consumer spaces. If one cannot deploy two WIFI channels simultaneously (dual radio) at B-Tx, then one of these channels may be substituted with a Bluetooth channel, which is available alongside WIFI in most smart devices today.

A noteworthy aspect of our orthogonal-band tag designs is that they are completely passive. They do not require the use of active components like additional oscillators and impedance-switching circuits to accomplish the frequency shift. Tag antenna designs in accordance with the present invention can be made to work with existing EPC Gen2 chips (two phase protocol) as well as other chips that enable a single phase protocol for use with off-the-shelf WIFI/Bluetooth devices.

The following is noted. While the B-Tx can employ WIFI and/or Bluetooth (called Ble hereafter) for both its TS and FS, the B-Rx can also employ WIFI and/or Bluetooth/BLE. In one specific instantiation, we realize the following set-up. The B-Rx is configured to receive a BS signal that is a Ble packet on a Ble advertisement channel ($f_2$). The B-Tx uses its WIFI interface to embed the desired Ble packet at $f_1$. In other words, the Ble packet's contents are generated in such a way that when appropriately embedded into the WIFI packet (i.e. altering the contents of WIFI packet), the resulting WIFI signal TS's frequency spectrum will have the Ble signal at $f_1$ embedded in it. The B-Tx uses another WIFI interface to embed the two carrier tones, separated by $\lambda f$ so as to generate the FS signal. The contents of this WIFI packet are determined such that its frequency spectrum has two carrier tones separated by $\lambda f$. The two WIFI interfaces are coordinated to generate the TS and FS signals simultaneously. The tag then backscatters the Ble signal at $f_1$ to $f_1 \pm \lambda f$ to allow the B-Rx to receive the Ble packet at $f_2$.

A description will now be given regarding locating objects, in accordance with one or more embodiments of the present invention.

While the previous sections discussed how to tag and monitor (read) various objects in indoor spaces, the present invention is also readily equipped to localize the object that is being read. Recall that the present invention can leverage distributed backscattering, where a potentially mobile device like a smartphone can serve as the B-Tx or B-Rx. The mobility of the smartphone increases the diversity and hence reliability of reading the tags by allowing it to get in proximity of the tags. Hence, if the smartphone can be localized when it is reading a tag, then the location of the tag can be approximately inferred from the location of the smartphone itself. The present invention leverages this observation of help locate the tags and hence keep track of where the various tagged products and objects are in the indoor space.

Localization of the smartphone can be accomplished in one of several ways.

(i) One could localize the phone acoustically with the help of the other device involved in backscattering, namely a voice-activated smart device (e.g. Amazon Echo®, Google Home®, etc.). Both the B-Tx and B-Rx have access to a microphone as well as a speaker, with the voice-activated device having a microphone array. One could leverage the array to localize the phone using conventional techniques like TDOA (Time Difference Of Arrival).

(ii) Another approach is to leverage multiple, static WIFI devices like smart TVs, voice-activated wireless hubs, access points, etc. in the indoor space to multi-literate and localize the smartphone.

A description will now be given regarding other aspects of the present invention, in accordance with one or more embodiments of the present invention.

Recall that the present invention can be used for tagging objects in indoor spaces using existing wireless infrastructure and eliminating the need for the deployment of any additional infrastructure such as RFID. While the B-Tx and B-Rx in the present invention are chosen to be two separate smart devices (e.g. Amazon Echo®, Google Home®, smartphones, etc.), they can also be co-located in the same smart device (illustrated in FIGS. 5 and 6). In the case of latter, they would use their existing radios to enable ambient, orthogonal-band backscattering but still wouldn't require the need for RFID and its self-interference cancellation.

If one is open to deploying a RF infrastructure in indoor spaces, either standalone or being integrated into existing smart devices, then one can directly leverage mono-static backscattering on the same device to tag indoor objects. Note that this requires a new wireless technology to be integrated into existing devices or a new device to be deploy, both of which add to cost. Further, being mono-static in nature (i.e., on a single static device), its ability to reliably read all the tags in the environment could be significantly limited.

Figure 7:
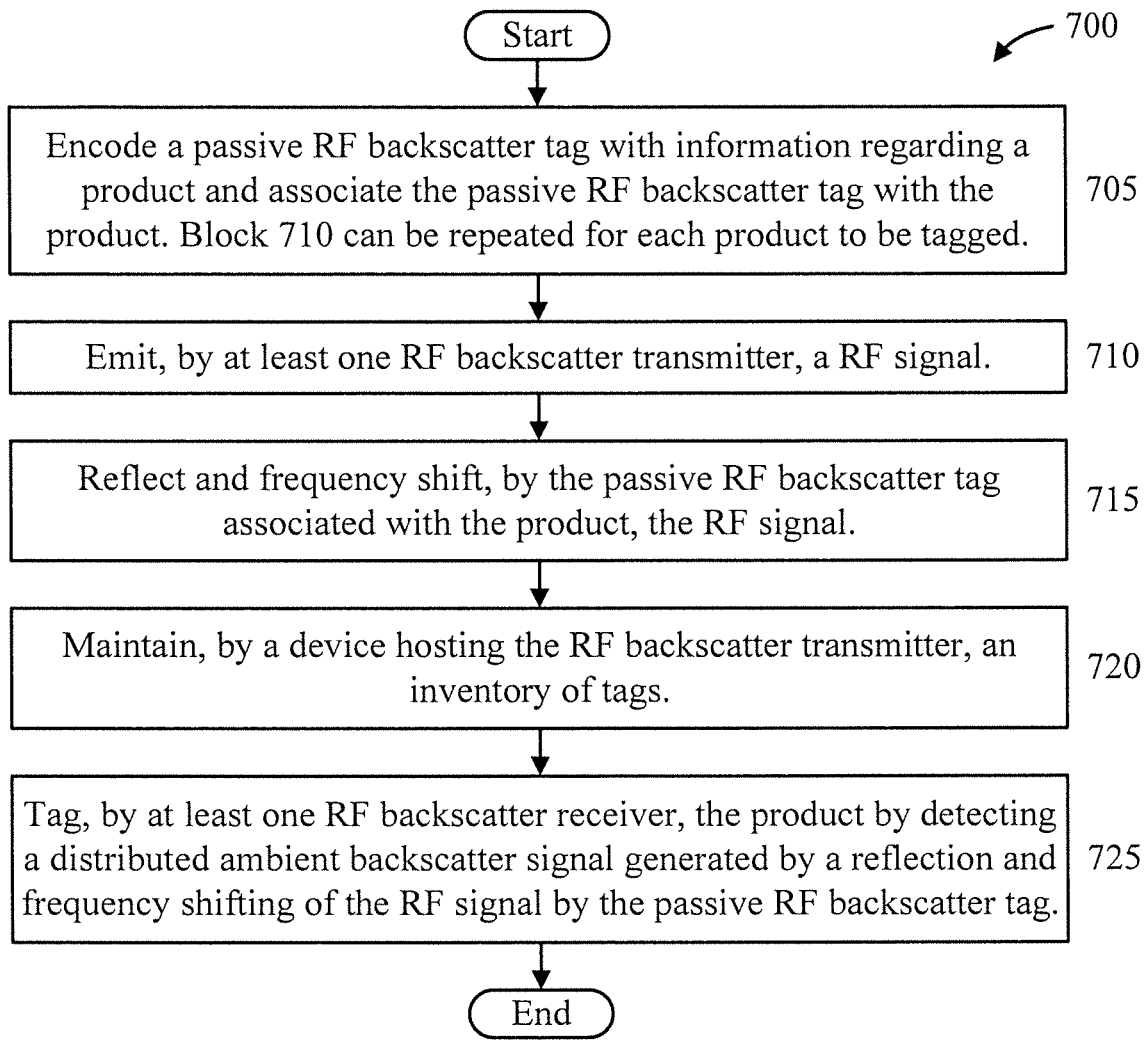
FIG. 7 is a flow diagram showing an exemplary method for tagging objects in indoor spaces using ambient, distributed backscatter, in accordance with an embodiment of the present invention.

FIG. 7 is a flow diagram showing an exemplary method 700 for tagging objects in indoor spaces using ambient, distributed backscatter, in accordance with an embodiment of the present invention.

At block 705, encode a passive RF backscatter tag with information regarding a product and associate the passive RF backscatter tag with the product. Block 710 can be repeated for each product to be tagged.

At block 710, emit, by at least one RF backscatter transmitter, a RF signal.

At block 715, reflect and frequency shift, by the passive RF backscatter tag associated with the product, the RF signal.

At block 720, maintain, by a device hosting the RF backscatter transmitter, an inventory of tags.

At block 725, tag, by at least one RF backscatter receiver, the product by detecting a distributed ambient backscatter signal generated by a reflection and a frequency shifting of the RF signal by the passive RF backscatter tag. In an embodiment, the RF signal can be orthogonal to the distributed ambient backscatter signal.

A description will now be given regarding consumer-deployed tags in consumer spaces, in accordance with one or more embodiments of the present invention.

The ability to tag and monitor objects in indoor spaces is useful for the consumer (user) to understand and subsequently optimize their usage. The user can procure the tags directly and attach them to objects that are deemed important (e.g. passports, wallets, etc.) or those that the user would like to track and monitor for usage and inventory (e.g. food, stationary and cleaning products). As the user walks around the space, the ambient, distributed backscattering technology, deployed through an application on the user's smart device (that accesses its' WIFI and Bluetooth wireless interfaces) will read the tags in the vicinity and hence their associated products.

Given that the tags are static, as the user moves around, he can use the diversity of his positions and backscatter readings from the same tag to localize the tag with respect to the smart device. This will in turn locate the objects that are tagged in the environment. To translate the tag/product location from relative (to smart device that is moving) to absolute coordinates, one can leverage other static wireless devices in the environment, such as a wireless access point and/or a voice-activate smart speaker (e.g. Amazon Echo®, Google Home®, etc.). The static wireless device(s) will localize the user's smart device, while the latter localizes the tag, thereby allowing the user to locate the tagged products with respect to the location of the static wireless device(s). This would allow the user to create an inventory as well as a blue-print of where different products are located in the consumer space. The localization of the user's smart device can be accomplished acoustically if a static voice-activated smart device is leveraged. The latter, having access to a microphone array and speaker, can leverage the array to localize the user's smart device using conventional techniques like TDOA (time difference of arrival). Another approach is to leverage WIFI from multiple, static devices (e.g., smart TVs, voice-activated wireless hubs, access points, etc.) to multi-literate and localize the smartphone.

Such a tracking and inventory feature provides several benefits to the consumer. Some exemplary scenarios include: (i) the user can readily access the inventory of products in his home, when he is shopping in a store; (ii) an application can remind the user at a configured frequency that a particular product(s) is out of stock at home and needs to be re-stocked; (iii) the user can identify mis-placed objects around the indoor space (e.g., based on the backscatter signal and a map of proper product locations).

Figure 8:
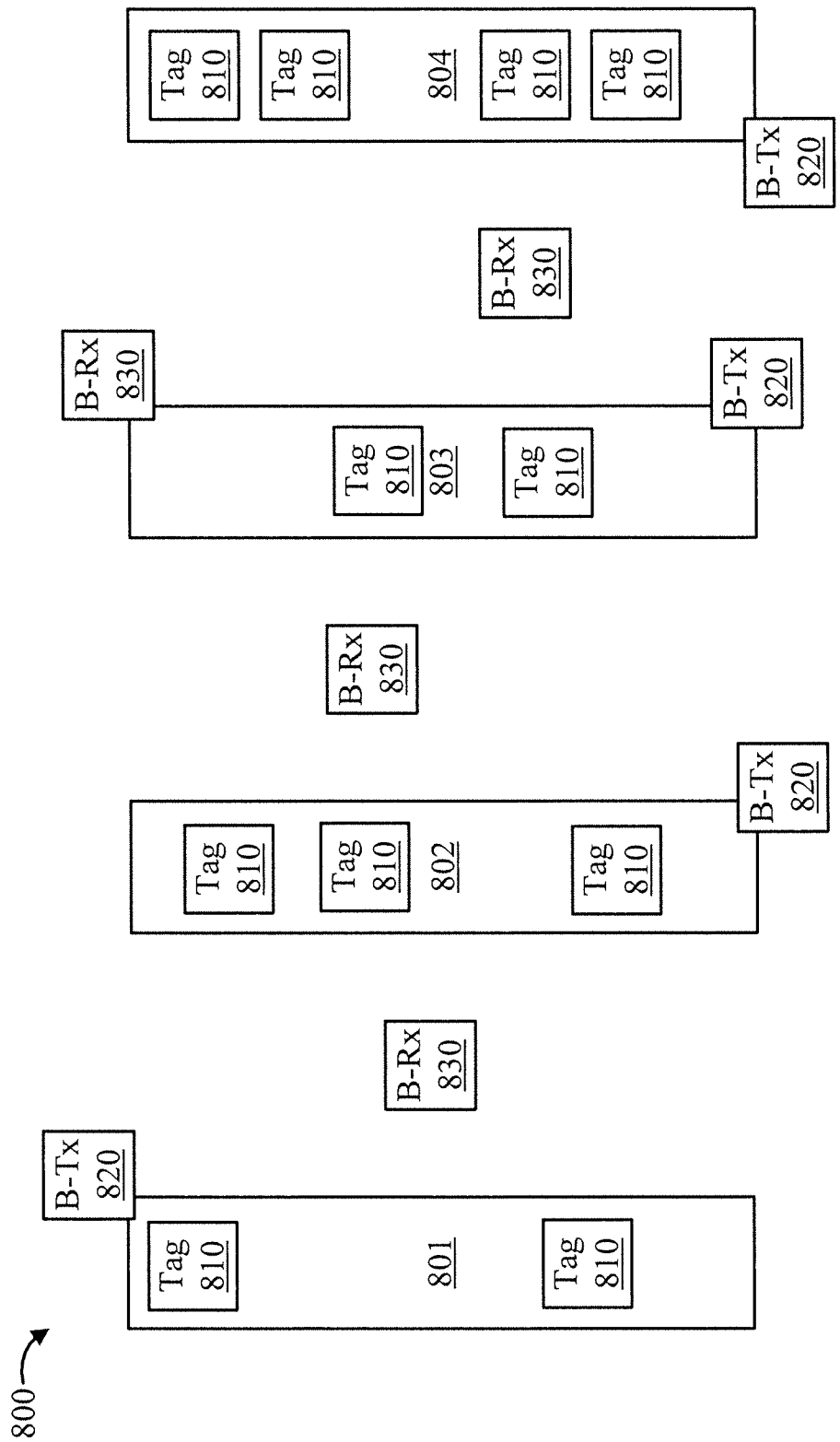
FIG. 8 is a block diagram showing an exemplary store environment to which the present invention can be applied, in accordance with an embodiment of the present invention.

FIG. 8 is a block diagram showing an exemplary store environment 800 to which the present invention can be applied, in accordance with an embodiment of the present invention.

The environment 800 includes a multiple aisles 801-804, each having one or more B-Tx's and one or more R-Tx's, e.g., one a per aisle or per area basis, in order to tag objects on the shelves of the aisles.

Tags 810 can be read by B-Rx's 820 after being tagged by B-Tx's 810. At least some of the B-Tx's 820 and B-Rx's 830 are comprised in user devices of users and/or employees walking through the aisles. The users and/or employees can receive messages via their devices (e.g., phones) regarding information associated with items tagged by a user. In this way, various aspects of the present invention, such as inventory control, product misplacement, couponing, and so forth can be achieved.

Figure 9:
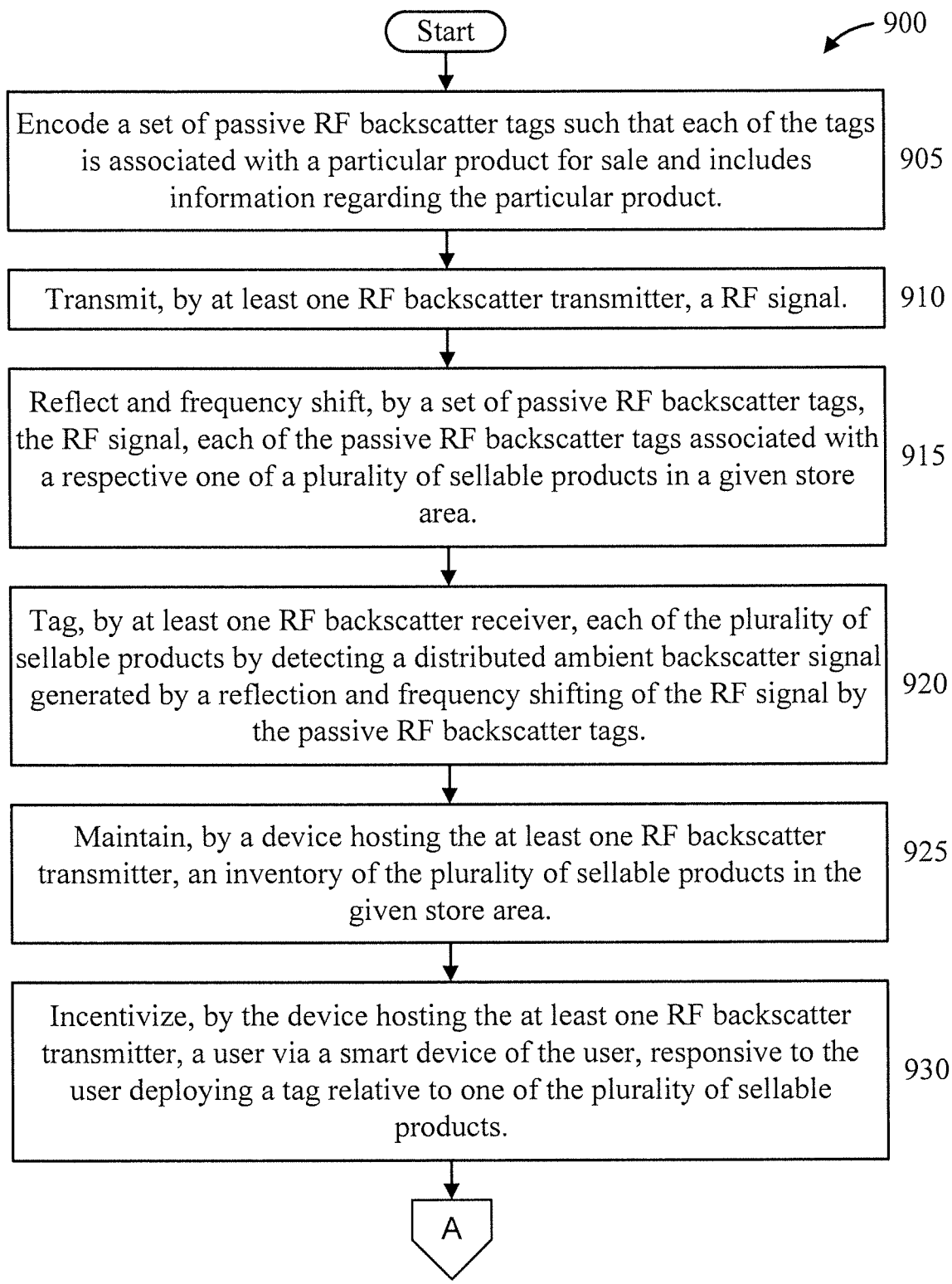
FIGS. 9-10 are flow diagrams showing an exemplary method for maintaining an in-store inventory, in accordance with an embodiment of the present invention.
Figure 10:
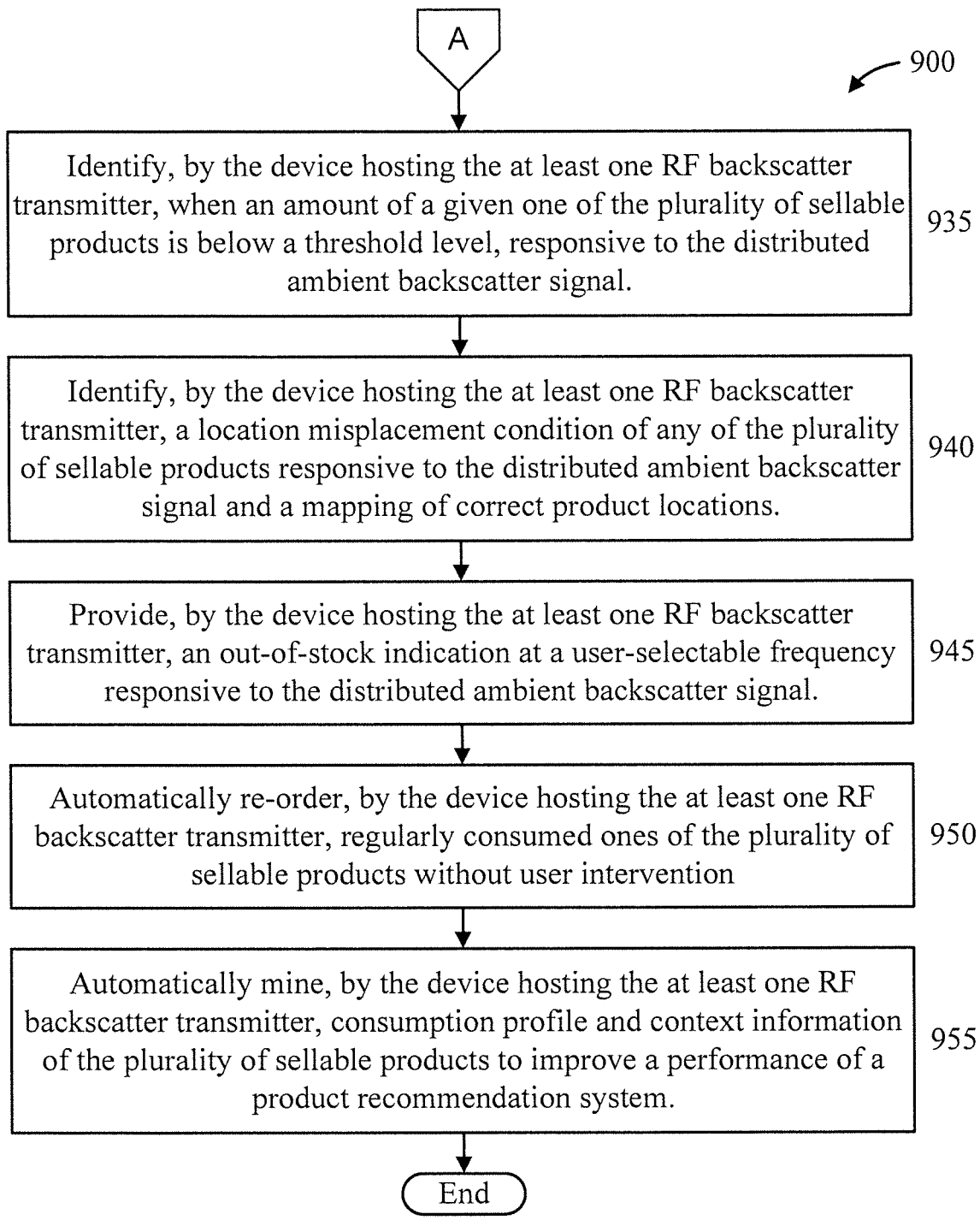

FIGS. 9-10 are flow diagrams showing an exemplary method 900 for maintaining an in-store inventory, in accordance with an embodiment of the present invention.

At block 905, encode a set of passive RF backscatter tags such that each of the tags is associated with a particular product for sale and includes information regarding the particular product.

At block 910, transmit, by at least one RF backscatter transmitter, a RF signal.

At block 915, reflect and frequency shift, by a set of passive RF backscatter tags, the RF signal, each of the passive RF backscatter tags associated with a respective one of a plurality of sellable products in a given store area.

At block 920, tag, by at least one RF backscatter receiver, each of the plurality of sellable products by detecting a distributed ambient backscatter signal generated by a reflection and a frequency shifting of the RF signal by the passive RF backscatter tags.

At block 925, maintain, by a device hosting the at least one RF backscatter transmitter, an inventory of the plurality of sellable products in the given store area.

At block 930, incentivize, by the device hosting the at least one RF backscatter transmitter, a user via a smart device of the user, responsive to the user deploying a tag relative to one of the plurality of sellable products.

At block 935, identify, by the device hosting the at least one RF backscatter transmitter, when an amount of a given one of the plurality of sellable products is below a threshold level, responsive to the distributed ambient backscatter signal.

At block 940, identify, by the device hosting the at least one RF backscatter transmitter, a location misplacement condition of any of the plurality of sellable products responsive to the distributed ambient backscatter signal and a mapping of correct product locations.

At block 945, provide, by the device hosting the at least one RF backscatter transmitter, an out-of-stock indication at a user-selectable frequency responsive to the distributed ambient backscatter signal.

At block 950, automatically re-order, by the device hosting the at least one RF backscatter transmitter, regularly consumed ones of the plurality of sellable products without user intervention.

At block 955, automatically mine, by the device hosting the at least one RF backscatter transmitter, consumption profile and context information of the plurality of sellable products to improve a performance of a product recommendation system.

A description will now be given regarding retailer-deployed tags in consumer spaces, in accordance with an embodiment of the present invention.

The previous model provides complete freedom to consumers to determine which products they would like to tag and hence track/monitor. However, the information relating to the usage of such products and the shopping/consumption behavior of users, will not be available to the retailers. The availability of such information to the retailers will not only help them provide value-added shopping services to consumers based on analytics, but will also help them better design their personalized advertisements and marketing strategy, product delivery and selling processes, as well as inventory management.

For the retailer to derive insights into the consumption of products in consumer space, the retailer needs to influence the tagging of products either directly or indirectly. Either the retailer can tag the products directly at the warehouse or distribution center, or indirectly incentivize (via coupons, discounts, rewards, etc.) the user (e.g., via an application on a user device (e.g., a smart phone)) to tag products once they are in the consumer space. However, the application needed to enable and use ambient backscattering for reading the tags will be provided by the retailer, thereby giving the retailer access to product information and their consumption in indoor spaces. The application can run directly on the consumer's smart device, which serves as both the B-Tx and B-Rx. Alternatively, the retailer (such as Amazon®, Google® or Apple®) can use their voice-activated smart devices (such as Echo, Home, etc.) as both the B-Tx and B-Rx; or use their static device as just the B-Tx, while the user's mobile device serves as the B-Rx; or use both the static and user devices as B-Tx, while user device serves as B-Rx. In the set-ups, where both static and user devices are involved, the application will run on both the B-Tx and B-Rx in a coordinated manner. In addition to reading of tags/products, the retailers can also track the location of the products, thereby providing contextual information, as in the previous use case.

Such product tracking and monitoring information can be integrated with the retailers' e-commerce systems to enable several features: (i) automate re-ordering of regularly consumed products as appropriate without user intervention; (ii) incentivize and influence shopping behavior of users through personalized coupons; (iii) mine consumption profile and context information (e.g., location) of products to build better recommender systems that can provide personalized suggestions for products in other related categories (based on context and wide-spread data from several customers); etc.

A description will now be given regarding retailer-deployed tags in retail spaces, in accordance with one or more embodiments of the present invention.

Similar to consumer spaces, the retailer can realize the ambient backscatter technology directly in retail spaces/stores. The retailer would deploy his static wireless devices as B-Tx and tag the products in the store, while the users mobile devices will serve as the B-Rx. Instead of the users interacting with objects in their homes and consumer spaces as in the previous use-case, they will now interact directly with products in retail stores. The retailer can use this technology to not only track inventory of products in the store in real-time, but by allowing users to directly interact with the products, the retailer can get valuable insights into user shopping behavior that can used to influence their shopping decisions in real-time.

Such a feature delivers several benefits to the retailer: (i) enables real-time inventory of products in the store; (ii) capture real-time interaction of customers with products to influence buying decisions through targeted coupons, recommendations, etc.; (iii) better shopping experience for users by providing real-time assistance on interested products directly on their phones; etc.

A description will now be given regarding venue-deployed tags in commercial spaces, in accordance with one or more embodiments of the present invention.

Another interesting use case of this technology is their application in large venues, both indoor and outdoor, where they can be deployed to provide navigation assistance as well as location-based targeted information. The venue owner will deploy the B-Tx and the tags, while the users will bring their own smart devices that will serve as B-Rx and interact with the tags directly. Given the inexpensive nature of these tags, they can be deployed densely to serve as landmark beacons that can enable several applications: (i) navigation in large venues like theme parks, convention/event centers, hospitality centers, indoor or outdoor tourist attractions, etc.; and (ii) deliver location-specific information that could be useful to visitors in applications such as exhibit description in museums/zoos, landmark description in popular tourist spots, event information in different parts of an event center, etc.

Figure 11:
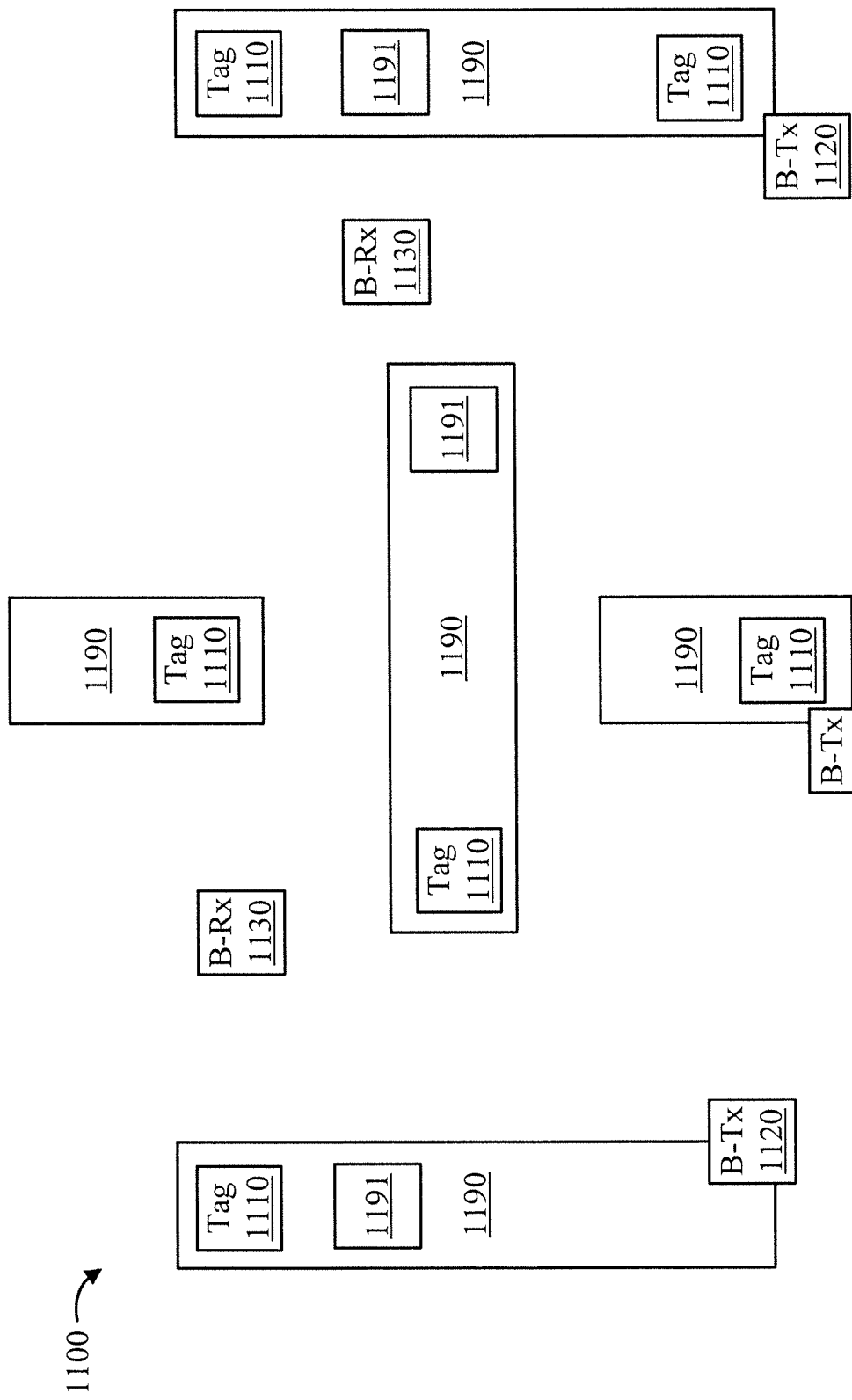
FIG. 11 is a block diagram showing an exemplary environment enabled with tagged navigation markers to which the present invention can be applied, in accordance with an embodiment of the present invention.

FIG. 11 is a block diagram showing an exemplary environment 1100 enabled with tagged navigation markers to which the present invention can be applied, in accordance with an embodiment of the present invention.

The navigation markers 1190 are fixed objects that can be used for navigation purposes. Passive RF backscatter tags 1110 are affixed to each of the navigation markers 1190 which can be tagged in order to receive information responsive to tagging.

At least one B-RX 1130 and at least one B-Tx 1120 are included in environment 1100, can be associated with the navigation makers and/or are associated with user devices (e.g., smart phones) of users. The navigation marker 1190 could have a speaker or display 1191 coupled to it that announces or shows navigation information to a user.

The benefits to venue owners (private or government) include (i) better user experience in navigating and exploring the venue; (ii) more efficient use of venue resources by better-informed customers; (iii) traffic analytics for venue owner to better restructure venue facilities and provision resources; and so forth.

Figure 12:
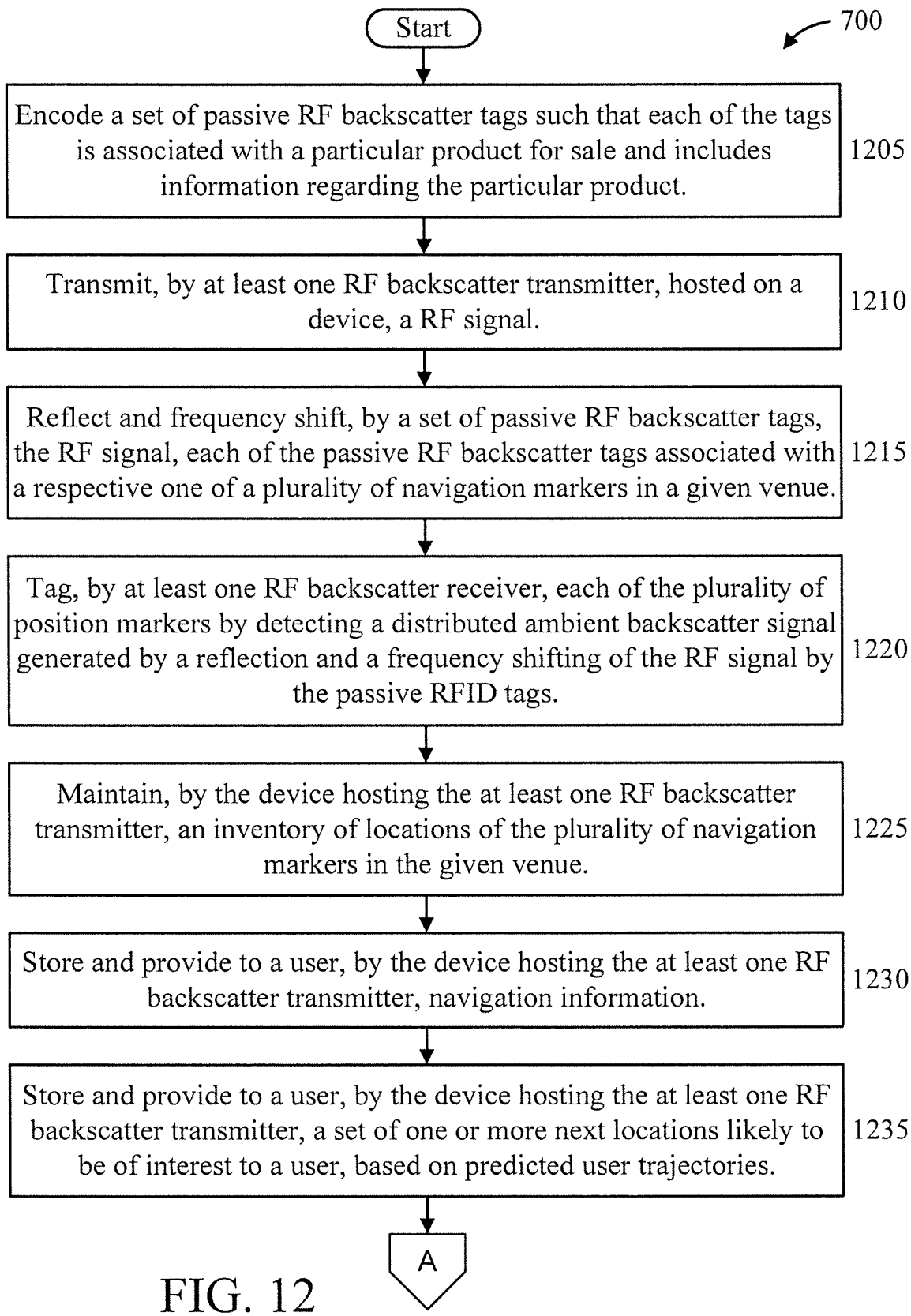
FIGS. 12-13 are flow diagrams showing an exemplary method for indoor navigation assistance, in accordance with an embodiment of the present invention.
Figure 13:
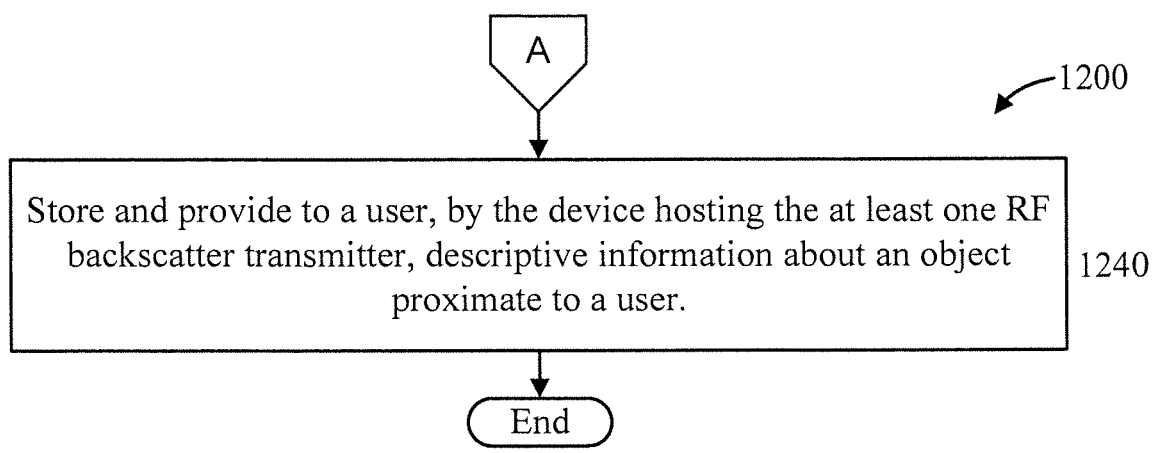

FIGS. 12-13 are flow diagrams showing an exemplary method 1200 for indoor navigation assistance, in accordance with an embodiment of the present invention.

At block 1205, encode a set of passive RF backscatter tags such that each of the tags is associated with a particular product for sale and includes information regarding the particular product.

At block 1210, transmit, by at least one RF backscatter transmitter, hosted on a device, a RF signal.

At block 1215, reflect and frequency shift, by a set of passive RF backscatter tags, the RF signal, each of the passive RF backscatter tags associated with a respective one of a plurality of navigation markers in a given venue.

At block 1220, tag, by at least one RF backscatter receiver, each of the plurality of position markers by detecting a distributed ambient backscatter signal generated by a reflection and frequency shifting of the RF signal by the passive RF backscatter tags.

At block 1225, maintain, by the device hosting the at least one RF backscatter transmitter, an inventory of locations of the plurality of navigation markers in the given venue.

At block 1230, store and provide to a user, by the device hosting the at least one RF backscatter transmitter, navigation information. In an embodiment, the navigation information is provided relative to user-observable ones of the navigation markers.

At block 1235, store and provide to a user, by the device hosting the at least one RF backscatter transmitter, a set of one or more next locations likely to be of interest to a user, based on predicted user trajectories.

At block 1240, store and provide to a user, by the device hosting the at least one RF backscatter transmitter, descriptive information about an object proximate to a user.

The information stored and provided to the user in the preceding blocks can be provided to the user in acoustic form or visual form.

Figure 14:
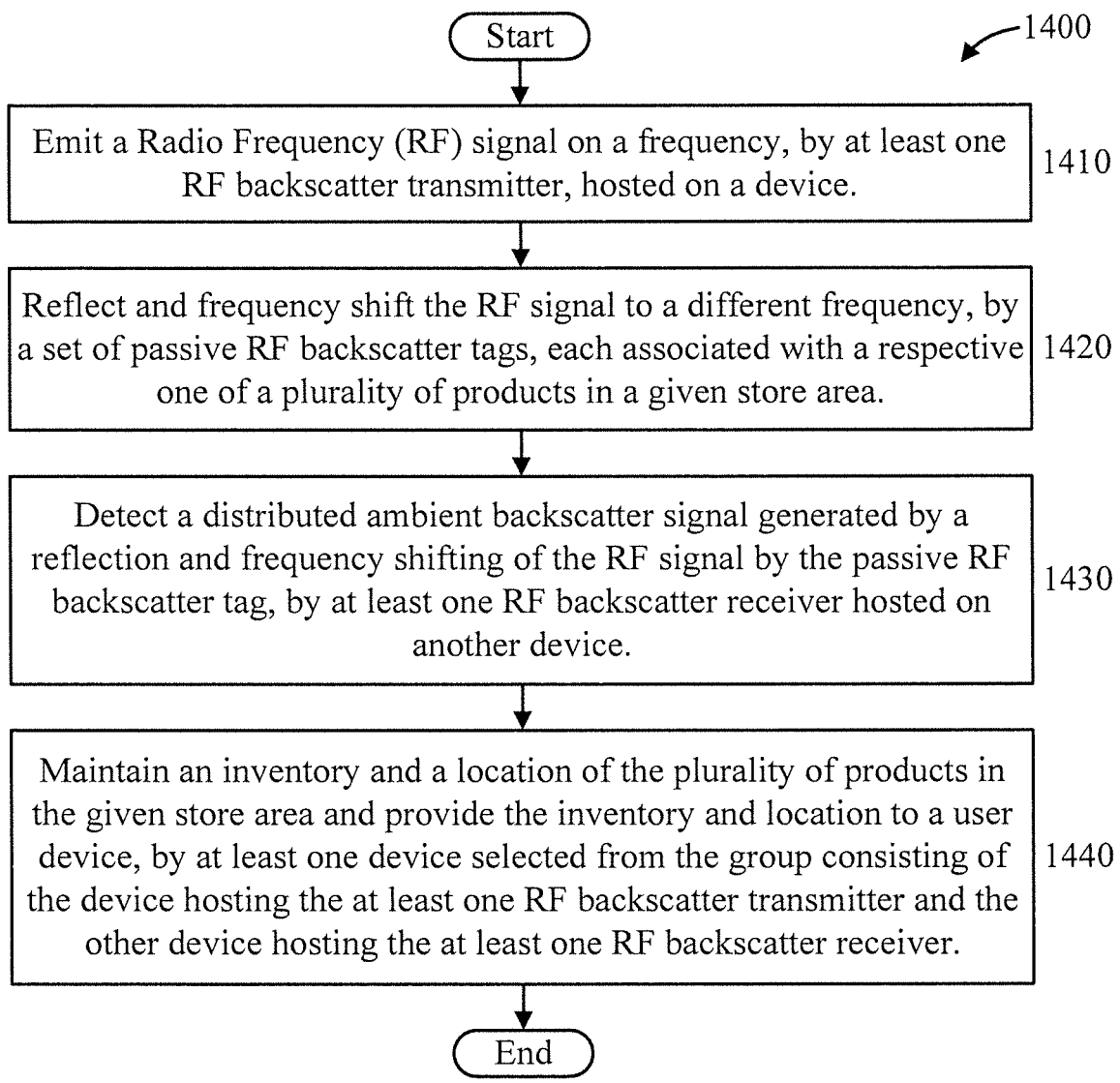
FIG. 14 is a flow diagram showing an exemplary in-store interaction and location system for interfacing users with products system, in accordance with an embodiment of the present invention.

FIG. 14 is a flow diagram showing an exemplary in-store interaction and location system for interfacing users with products system, in accordance with an embodiment of the present invention.

At block 1410, emit a Radio Frequency (RF) signal on a frequency, by at least one RF backscatter transmitter, hosted on a device.

At block 1420, reflect and frequency shift the RF signal to a different frequency, by a set of passive RF backscatter tags, each associated with a respective one of a plurality of products in a given store area.

At block 1430, detect a distributed ambient backscatter signal generated by a reflection and frequency shifting of the RF signal by the passive RF backscatter tag, by at least one RF backscatter receiver hosted on another device.

At block 1440, maintain an inventory and a location of the plurality of products in the given store area and provide the inventory and location to a user device, by at least one device selected from the group consisting of the device hosting the at least one RF backscatter transmitter and the other device hosting the at least one RF backscatter receiver.

In an embodiment, the backscatter tag is configured to frequency shift and backscatter the RF signal from the at least one RF backscatter transmitter onto a different orthogonal channel for reception by the receiver.

In an embodiment, the at least one RF backscatter transmitter and the at least one RF backscatter receiver coordinate usage of multiple channels for backscattering, with at least one of the multiple channels configured for transmission and at least one of remaining channel from among the multiple channels configured for reception, and wherein the passive RF backscatter tag includes a passive non-linear device to generate a mixed frequency detected as the distributed ambient backscatter signal on the at least one of the remaining channels. In an embodiment, a transmission from the at least one RF backscatter transmitter comprises a signal required for shifting the frequency of the distributed ambient backscatter signal by the passive tag.

In an embodiment, the passive backscatter tag is configured to backscatter the RF signal simultaneously on a first band used by the at least one RF backscatter transmitter and a second band that is orthogonal to the first band and used by the at least one RF backscatter receiver.

In an embodiment, the at least one RF backscatter transmitter and the at least one RF backscatter receiver are hosted in a same mobile or stationary device in a mono-static configuration.

In an embodiment, the at least one RF backscatter transmitter and the at least one RF backscatter receiver are hosted on two separate devices in a bi-static configuration.

In an embodiment, the passive RF backscatter tags store information relevant to a product or a place, and modulate the RF signal to convey the information to the at least one RF backscatter receiver.

In an embodiment, the at least one RF backscatter transmitter and the at least one RF backscatter receiver are embodied in existing re-purposed devices having a primary purpose other than tagging products.

In an embodiment, the at least one RF backscatter receiver is configured to infer its location based on locations of products in proximity having the passive RF backscatter tags read by the at least one RF backscatter receiver. In an embodiment, the location of the at least one RF backscatter receiver indicates the location of a user, at which customer assistance can be requested. In an embodiment, user interest in specific products, as indicated through a software application, is used to filter the tagged products read in a vicinity of a user and provide relevant product information to the user. In an embodiment, user interest in a particular one of the plurality of products is used to show a location of the particular one of the plurality of products relative to a location of a user on a store map application, along with a navigation trajectory to reach the particular one of the plurality of products.

In an embodiment, the device hosting the at least one RF backscatter transmitter and the other device hosting the at least one RF backscatter receiver are configured and coordinated through a software application made available on a user smart device. In an embodiment, the software application is provided by a retailer, and wherein the set of passive RF backscatter tags are deployed on the plurality of products by one or more entities selected from the group consisting of a distribution center operator, fulfillment center operator and a retailer.

In an embodiment, at least one of the at least one RF backscatter transmitter and the other device hosting the at least one RF backscatter receiver is configured to take inventory and identify when an amount of a given one of the plurality of products is below a threshold level, responsive to the distributed ambient backscatter signal.

In an embodiment, at least one of the device hosting the at least one RF backscatter transmitter and the device hosting the at least one RF backscatter receiver is configured to identify a location misplacement condition of any of the plurality of products responsive to the distributed ambient backscatter signal and a mapping of correct product locations.

In an embodiment, at least one of the device hosting the at least one RF backscatter transmitter and the other device hosting the at least one RF backscatter receiver is configured to provide an out-of-stock indication at a retailer-selectable frequency responsive to the distributed ambient backscatter signal.

In an embodiment, at least one of the device hosting the at least one RF backscatter transmitter and the other device hosting the at least one RF backscatter receiver is configured to automatically mine an interest profile and context information of the plurality of products based on user dwell time to improve a performance of a product recommendation system and inventory management system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. An in-store interaction and location system, comprising:
   at least one RF backscatter transmitter, hosted on a device, configured to emit a Radio Frequency (RF) signal on a frequency;
   a set of passive RF backscatter tags, each associated with a respective one of a plurality of products in a given store area and configured to reflect and frequency shift the RF signal to a different frequency; and
   at least one RF backscatter receiver, hosted on another device, configured to read the plurality of products on the different frequency by detecting a distributed ambient backscatter signal generated by a reflection and frequency shifting of the RF signal by the passive RF backscatter tag,
   wherein at least one device selected from the group consisting of the device hosting the at least one RF backscatter transmitter and the other device hosting the at least one RF backscatter receiver is configured to maintain an inventory and a location of the plurality of products in the given store area and provide the inventory and location to a user device, and
   wherein the at least one RF backscatter transmitter and the at least one RF backscatter receiver coordinate usage of multiple channels for backscattering, with at least one of the multiple channels configured for transmission and at least one of remaining channel from among the multiple channels configured for reception, and wherein the passive RF backscatter tag comprises a passive non-linear device to generate a mixed frequency detected as the distributed ambient backscatter signal on the at least one of the remaining channels.

2. The in-store interaction and location system of claim 1, wherein the backscatter tag is configured to frequency shift and backscatter the RF signal from the at least one RF backscatter transmitter onto a different orthogonal channel for reception by the receiver.

3. The in-store interaction and location system of claim 1, wherein a transmission from the at least one RF backscatter transmitter comprises a signal required for shifting the frequency of the distributed ambient backscatter signal by the passive tag.

4. The in-store interaction and location system of claim 1, wherein the passive backscatter tag is configured to backscatter the RF signal simultaneously on a first band used by the at least one RF backscatter transmitter and a second band that is orthogonal to the first band and used by the at least one RF backscatter receiver.

5. The in-store interaction and location system of claim 1, wherein the at least one RF backscatter transmitter and the at least one RF backscatter receiver are hosted in a same mobile or stationary device in a mono-static configuration.

6. The in-store interaction and location system of claim 1, wherein the at least one RF backscatter transmitter and the at least one RF backscatter receiver are hosted on two separate devices in a bi-static configuration.

7. The in-store interaction and location system of claim 1, wherein the passive RF backscatter tags store information relevant to a product or a place, and modulate the RF signal to convey the information to the at least one RF backscatter receiver.

8. The in-store interaction and location system of claim 1, wherein the at least one RF backscatter transmitter and the at least one RF backscatter receiver are embodied in existing re-purposed devices having a primary purpose other than tagging products.

9. The in-store interaction and location system of claim 1, wherein the at least one RF backscatter receiver is configured to infer its location based on locations of products in proximity having the passive RF backscatter tags read by the at least one RF backscatter receiver.

10. The in-store interaction and location system of claim 9, wherein the location of the at least one RF backscatter receiver indicates the location of a user, at which customer assistance can be requested.

11. The in-store interaction and location system of claim 9, where user interest in specific products, as indicated through a software application, is used to filter the tagged products read in a vicinity of a user and provide relevant product information to the user.

12. The in-store interaction and location system of claim 9, where user interest in a particular one of the plurality of products is used to show a location of the particular one of the plurality of products relative to a location of a user on a store map application, along with a navigation trajectory to reach the particular one of the plurality of products.

13. The in-store interaction and location system of claim 1, wherein the device hosting the at least one RF backscatter transmitter and the other device hosting the at least one RF backscatter receiver are configured and coordinated through a software application made available on a user smart device.

14. The in-store interaction and location system of claim 13, wherein the software application is provided by a retailer, and wherein the set of passive RF backscatter tags are deployed on the plurality of products by one or more entities selected from the group consisting of a distribution center operator, fulfillment center operator and a retailer.

15. The in-store interaction and location system of claim 1, wherein at least one device selected from the group consisting of the device hosting the at least one RF backscatter transmitter and the other device hosting the at least one RF backscatter receiver is configured to take inventory and identify when an amount of a given one of the plurality of products is below a threshold level, responsive to the distributed ambient backscatter signal.

16. The in-store interaction and location system of claim 1, wherein at least one device selected from the group consisting of the device hosting the at least one RF backscatter transmitter and the other device hosting the at least one RF backscatter receiver is configured to identify a location misplacement condition of any of the plurality of products responsive to the distributed ambient backscatter signal and a mapping of correct product locations.

17. The in-store interaction and location system of claim 1, wherein at least one device selected from the group consisting of the device hosting the at least one RF backscatter transmitter and the other device hosting the at least one RF backscatter receiver is configured to provide an out-of-stock indication at a retailer-selectable frequency responsive to the distributed ambient backscatter signal.

18. The in-store interaction and location system of claim 1, wherein at least one device selected from the group consisting of the device hosting the at least one RF backscatter transmitter and the other device hosting the at least one RF backscatter receiver is configured to automatically mine an interest profile and context information of the plurality of products based on user dwell time to improve a performance of a product recommendation system and inventory management system.

19. A method for maintaining an in-store interaction and location information, comprising:
    emitting, by at least one RF backscatter transmitter hosted on a device, a Radio Frequency (RF) signal on a frequency;
    reflecting and frequency shifting, by a passive RF backscatter tag associated with a product, the RF signal to a different frequency;
    reading, by at least one RF backscatter receiver, the product on the different frequency by detecting a distributed ambient backscatter signal generated by a reflection and frequency shifting of the RF signal by the passive RF backscatter tag;
    maintaining, by at least one device selected from the group consisting of the device hosting the at least one RF backscatter transmitter and the other device hosting the at least one RF backscatter receiver, an inventory and a location of the plurality of products in the given store area; and
    providing, by the at least one device, the inventory and location to a user device, and
    wherein the at least one RF backscatter transmitter and the at least one RF backscatter receiver coordinate usage of multiple channels for backscattering, with at least one of the multiple channels configured for transmission and at least one of remaining channel from among the multiple channels configured for reception, and wherein the passive RF backscatter tag comprises a passive non-linear device to generate a mixed frequency detected as the distributed ambient backscatter signal on the at least one of the remaining channels.

* * * * *